(12) United States Patent
Tu et al.

(10) Patent No.: US 8,153,038 B2
(45) Date of Patent: Apr. 10, 2012

(54) TYPE OF WOOD SECTION MATERIAL AND ITS MANUFACTURING METHOD

(75) Inventors: Dengyun Tu, Huzhou (CN); Chengfeng Pan, Huzhou (CN); Xin Zhang, Huzhou (CN); Yuezhong Ni, Huzhou (CN); Xueli Yu, Huzhou (CN)

(73) Assignee: Zhejiang Shiyou Timber Co. Ltd., Zhejiang (CN)

( * ) Notice: Subject to any disclaimer, the term of this patent is extended or adjusted under 35 U.S.C. 154(b) by 0 days.

(21) Appl. No.: 13/175,970

(22) Filed: Jul. 5, 2011

(65) Prior Publication Data

US 2011/0262727 A1    Oct. 27, 2011

Related U.S. Application Data

(63) Continuation of application No. PCT/CN2010/070515, filed on Feb. 3, 2010.

(51) Int. Cl.
*C01B 31/00* (2006.01)

(52) U.S. Cl. ...... 264/29.4; 264/29.1; 264/237; 264/320; 144/329; 144/330; 144/364; 144/380; 428/535

(58) Field of Classification Search ............... 264/29.4, 264/29.1, 237, 320; 144/329, 330, 364, 380; 428/535
See application file for complete search history.

(56) References Cited

U.S. PATENT DOCUMENTS

| | | | |
|---|---|---|---|
| 7,404,422 B2 * | 7/2008 | Kamke et al. | 144/364 |
| 2010/0180987 A1 * | 7/2010 | Park et al. | 144/380 |

FOREIGN PATENT DOCUMENTS

| | | | |
|---|---|---|---|
| CN | 101214675 A | | 7/2008 |
| CN | 101486212 A2 | | 7/2009 |
| CN | 201320793 Y | | 10/2009 |
| CN | 101570031 A | | 11/2009 |
| CN | 101602623 A | | 12/2009 |
| EP | 2255937 A1 | | 1/2010 |
| JP | 2000238015 A | | 9/2000 |
| JP | 2006035792 A | | 9/2006 |
| KR | 20030012322 A | | 2/2003 |

OTHER PUBLICATIONS

International Search Report for PCT/CN2010/070453, Oct. 8, 2010, State Intellectual Property Office of China.
International Search Report for PCT/CN2010/070515, Sep. 30, 2010, State Intellectual Property Office of China.
U.S. Appl. No. 13/175,903, filed Jul. 4, 2011.

* cited by examiner

*Primary Examiner* — Christina Johnson
*Assistant Examiner* — Saeed Huda
(74) *Attorney, Agent, or Firm* — Olive Law Group, PLLC (57) ABSTRACT

The present invention relates to a type of wood section material manufacturing method, especially with respect to soft wood section material and its manufacturing method. It belongs to wood processing field. This invention is achieved by the following technical plans: a type of wood section material manufacturing method includes the following steps: (1) wood preparation; (2) drying; (3) Polishing; (4) Hot pressing, which is to use two hot pressing boards with 140-200° C. to firmly press two surfaces of panel blank material; (5) Pre-carbonization, which pre-carbonize the panel blank material under 160° C. and 200° C.; (6) Carbonization, which carbonize the panel blank material between 200° C. and 225° C.; (7) Cooling; and (8) Moisture content control. This invention is particularly suitable to make wooden floor boards and office furniture.

4 Claims, 3 Drawing Sheets

TYPE OF WOOD SECTION MATERIAL AND ITS MANUFACTURING METHOD

CROSS-REFERENCE TO RELATED APPLICATIONS

This application is a continuation of PCT application No. CN2010/070515 filed on Feb. 3, 2010, which claims priority to Chinese Patent Application No. CN200910156992.6 filed on Dec. 26, 2009, the entire contents of each of which are hereby incorporated by reference.

FIELD OF THE INVENTION

The present invention relates to a type of wood section material and its manufacturing method, especially the soft wood section material and its manufacturing method. It falls into wood processing field.

BACKGROUND OF THE INVENTION

Along with the exhaustion of natural wood resources and protection of national natural woods, artificial wood will become the main resources for national and international timber markets. Artificial wood includes fir, masson pine, larch, cottonwood and paulownia. They are featured in fast-growing speed, high yield quantity and short harvesting cycle. However, they have limited applications because of some innate defects caused by fast-growing speed such as low wood quality, low density and surface hardness, poor corrosion resistance and climate resistance, and easy to be distorted or cracked.

Wood functions improvement is an effective approach to change physical and chemical characteristics of artificial wood, whose density, surface hardness, corrosion resistance and dimensional stability improve to a large extent after process Then they can be used for solid wood floor boards, furniture and construction.

One of the methods to improve mechanical property of wood section material is compression.

Many studies have been done on fast-growing trees such as cotton wood, southern pine and masson pine due to their loose texture and large anisotropy and a number of successful domestic and international experiences can be used for reference.

However, the compressed wood rebounds seriously, especially under the conditions of water.

In order to eliminate the defects of the compressed wood, steam or resin is often used to fix the compressed wood to prevent rebound. For example, in 1996, Mrs. Fang Guizhen et al. used melamine-formaldehyde (MF) resin with different concentration of low molecular weight as the cross-linking agent to soak *populus ussuriensis* with 47% for ASE and 36% for MEE. The samples after processed by cross-linking agent with 10% concentration, compressed and soaked in room temperature, they were able to maintain their shape. It is still applicable to use cross-linking agent with 17.5% and 25% concentration and soak in boiling water. In 1997, Mrs. Fang Gunzhen studied the action mechanism between *populus ussuriensis* and MF cross-linking agent. In 1998, Mrs. Fang Guizhen et al. used PF performed polymer with different concentration to process *populus ussuriensis* and compress the *populus ussuriensis* along its transverse striation in heating process. It was found that the samples after the process of 10% PF performed polymer, ASE reached to 60% and MEE reached to 52%. It is able to maintain the shape no matter it was in room temperature or boiling water. In 1998, Mrs. Fang Guizhen et al. used 1,2,3,4-butanetetracarboxylic acid (BKA) as the cross-linking agent and NaH2PO2 as the accelerant to process *populus ussuriensis*, which is then compressed under constant temperature 150° C. Mrs. Fang Guizhen et al. used PF resin with different concentration of low molecular weight to process *populus ussuriensis* to improve its dimensional stability and mechanical strength. In 2000, Mrs. Fang Guizhen et al. conducted a research to use low chromaticity phenolic resin with low molecular weight to soak the wood and use phenolic resin with low molecular weight to improve the property of *populus ussuriensis*.

The existing surface-compressed solid wood is to soak the surface of the processed wood into the water for 5-6 hours and use microwave to heat the wood after some amount of water is infiltrated. Then it is compressed on the heating device and dried afterwards to fix the compressed product. However, after the wood is soaked by water, its surface contains large amount of water. When the water vaporizes, the wood surface would quickly contract to produce a large internal stress. Therefore, the surface is easy to crack or even rebounded because the internal stress of the surface is not balanced and fully solidified in the process of compression and drying.

Because the above method uses chemical agent to process the wood, it is inevitable to produce water gas/water and noise. The finished product has poor dimensional stability/corrosion resistance/climate resistance, low service life/yield quantity and easy to be distorted or cracked.

Chinese patent document (CN101603623A) publicized the patent of "a type of surface-reinforced solid wood product/floor board and their manufacturing method". The manufacturing method includes: (1) dry the log; (2) compress the log in a hot-press with temperature from 210-250° C.; (3) maintain the temperature of the compressed log for 20-60 minutes; and (4) control the moisture content of the log within 6-9%. However, the wood is easy to shrink and crack in drying by using above process with large wood consumption, low yield quantity (60%-70%), dark color and burning smell. The finished floor boards can only be used in northern China because of the dry weather. In southern China, the boards would be distorted with low corrosion resistance (grade III) and poor anti-corrosion ability.

Chinese patent document (CN101214675A) publicized the patent of "Wood Reinforcement Method by Hot-pressed Carbonization", in which (1) dry the wood in a drying kiln according to its density and control the moisture content within 3-17%; (2) polish the wood; (3) Put the polished wood in a hot-press with temperature from 160-260° C. for carbonization. Control the compression ratio within 5-50% and maintain the temperature for 10-240 minutes; cool the carbonized wood to below 80°; (4) place the wood in natural environment or a temperature & humidity test chamber and control the moisture content in 5-10% according to the purpose of the wood. By using above method, the wood is easy to be cracked during the carbonization process with low yield quantity (50%-60%), low corrosion resistance (below grade II), poor dimensional stability. Meanwhile the color of the wood would become darker due to excessive carbonization with burning smell.

Chinese patent document (CN101486212A) publicized the patent of "Manufacturing Method of Carbonized Three-layer Solid Laminated Floor Board (cottonwood)". The preparation of the surface material includes: cut cottonwood into panels and process them into thin boards according to compression ratio (30%, 40%, 50% and 60%) with thickness from 2-4 mm and moisture content from 20-40% after drying and polishing. Compress the boards in a press and use the pressure based on the required compression ratio under 70-110° C. Carbonize the compressed boards with certain pressure or in a dedicated clamp under 190-220° C. for 1.5-5 hours. As the carbonization device does not have ventilation, cool the thin boards to 40-60° C. under certain pressure after carbonization. Take out the boards and use wide-belt sander to remove the outer surface with dark color. The thickness of the finished boards would be at 2-4 mm. By using above method, because of large moisture content of cottonwood (at saturation point of fiber), the shrinkage ratio and surplus stress would be large under 70-110° C. and the wood is easy to crack during the carbonization under 190-220° C. As the compression ratio is big, the wood will be compressed in a whole piece, therefore the wood consumption becomes large. The ventilation holes in carbonization device will make the surface of the wood having uneven points. After polishing, the hardness of the boards where those points are present will decrease. If there is no moisture content adjustment treatment, the wood will be distorted if it absorbs humidity. Consequently such process is not good enough to be widely applied.

SUMMARY OF THE INVENTION

The present invention resolves the above technical problems and provides a manufacturing method for wood product. It solves the problems of soft wood such as softness, low density and easy to crack and distort by means of wood physical function improvement method. Meanwhile, it also addresses some technical problems of compressed wood such as large rebound, large wood consumption, pollution caused by soaked resin, poor dimensional stability/corrosion and resistance/climate resistance, distortability, low yield quantity, complicated production procedure and high energy consumption. The manufacturing method introduced in this invention is simple and environmental friendly. The yield quantity can reach to 99% or even 100% and the finished product has excellent dimensional stability/corrosion resistance/wear resistance, high surface hardness and long service life (above 70 years).

The technology employed in this invention is achieved by the following steps:

(1) Wood preparation: process the wood with density lower or equal to 700 kg/m³ 的to wood panels;

(2) Drying: dry the wood panels to reduce their moisture content to 6-20%;

(3) Polishing: polish the dried wood panels to obtain panel blank material;

(4) Hot pressing: use two hot pressing panels with 140-200° C. to press two surfaces of the panel blank material;

(5) Pre-carbonization: pre-carbonize the panel blank material under 160-200° C.;

(6) Carbonization: carbonize the panel blank material under 200-225° C.;

(7) Cooling; and (8) Moisture content control.

Airdry the soft wood (normally fast-growing timber) with density lower or equal to 700 kg/m³ and process them into panels with a length at 600 mm-2000 mm, width at 110 mm-200 mm and thickness at 30 mm-60 mm. Pile the panels in order, leave a gap at 15-25 mm between every two panels, and dry them. The said drying step uses high drying method under high temperature and humidity. This method is helpful to prevent the soft wood from shrinking, going moldy or creating blue stain, and product quality is maintained. Dry the panels to reduce their moisture content to 6-20%. Another preferred option is to place the panels in room temperature for 5 days and then dry them. It is effective to prevent the wood from cracking during the hot pressing stage. The reason to carry out drying step is because there is a big difference between every type of soft wood. As soft wood itself has huge aeolotropism, a smaller moisture content gradient is formed when drying under high temperature and humidity. It effectively prevents the wood from cracking on surface or inside and shrinking, hence low yield quantity and hot pressing influence are avoided. Meanwhile under high temperature conditions, it is helpful to restrain insects growing or to kill the bacteria to prevent the wood from going moldy or creating stain. As preferred, dry the panels with resin until the moisture content reaches to 12-16% and dry the panels without resin until the moisture content reaches to 8-12%. If moisture content is too low (e.g. 3-5%), the panels are easy to break during hot pressing and carbonization stage. If moisture content is too high (e.g. 20-40%), the water vapor inside panels would generate high pressure. Since the panels for hot pressing and carbonization have small density and are from fast-growing timber, such high pressure would easily lead panels to crack. From practical application, the above method used to process panels can make the yield quantity reach to as high as 99%. Use Weinig Unimat moulder U23EL to polish the wood surface after drying and select two opposite surfaces to be compressed (maintain the parallel between the polished surface and fiber) to obtain the panel blank material with thickness at 20 mm-27 mm. Proceed with the following steps (i.e. hot pressing, pre-carbonization and carbonization) to polished panel blank material in turns can control the moisture content after cooling.

As preferred the hot pressing is to put panel blank material on the hot press, close the hot pressing panels with the speed of 0.5-6 mm/s. Control the compression ratio of panel blank material at 10-30%, pressure at 20-50 MPa and hot pressing panel temperature at 150-160° C. and maintain the temperature and pressure for 30 min-120 min. The said pre-carbonization step is to raise the hot pressing panels temperature to 170-180° C. and maintain the temperature and pressure for 30 min-120 min after compression; the said carbonization step is to raise the hot pressing panels temperature to 200-225° C. and maintain the temperature and pressure for 45 min-120 min after pre-carbonization. In hot pressing stage (i.e. 150-160° C. for 30 min-120 min), the panel blank material is compressed to the required dimension. Only two opposite surfaces of the panel blank material with 1-10 mm are compressed with temperature and pressure maintaining for 30 min-120 min. 30 min-90 min is preferred and 45 min-90 min is more preferred. Make two opposite surfaces of the panel blank material to form a compacted layer with 0.6-4 mm. That is the first compacted layer and the second compacted layer. The density of the compacted layers is 1.3-3 times of the natural density. In above hot pressing stage, the preferred hot pressing closing speed is 0.5-4 mm/s, compression ratio 10-25% and pressure 30-40 MPa. In afterward pre-carbonization stage, raise the hot pressing panel temperature to 170-180° C. and maintain the temperature and pressure. In pre-carbonization stage, the moisture content of the panel blank material is further reduced. The panel blank material is fully heated, the water vapor pressure is smaller than the transverse tensile strength of the panel blank material; therefore the potential defects such as inner crack, surface crack, uneven color and distortion are avoided in the follow-up carbonization stage. The yield quantity can reach to 100%. After pre-carbonization stage, the carbonization stage is to immediately raise the hot pressing panel temperature to 200-225° C. and maintain the temperature and pressure for 45 min-120 min. In the carbonization stage, the panel blank material has a series of complicated chemical reaction and then it possesses the following characteristics:

1. Enhanced moisture resistance: moisture absorption mechanism of the panel blank material, after carbonization, has changed. Along with the rising temperature, the hemicellulose with strong moisture absorption is degraded and the panel blank material's moisture absorption capability decreases. As hydrogen bond between water molecule and the panel blank material reduces, the hygroscopicity and moisture absorbing capacity are reduced. Therefore, the moisture content of carbonized panel blank material is 45% (or more) lower than that of un-carbonized panel blank material;

2. Improved dimensional stability: As the panel blank material is processed in high temperature environment, the hydroxyl concentration, hygroscopicity and internal stress of the panel blank material are reduced in carbonization. The carbonized panel blank material has lower moisture exchanging ability with external environment. Consequently it effectively reduces the distortion, shrinkage and expansion caused by moisture content change for carbonized product;

3. Enhanced corrosion resistance and weather resistance: since the panel blank material creates a series of complicated chemical reaction in carbonization, some composition of the panel blank material is changed and nourishment for rot fungi of the panel blank material is reduced. It restrains the growth of fungus in the panel blank material in terms of food chain. Therefore, the corrosion resistance and weather resistance of carbonized panel blank material are enhanced. It has the feature of anti corrosion, termite proof and fungus resistance;

4. Environmental friendly and safe: carbonization process only uses physical technology. In carbonization stage, only temperature and water vapor are involved without any chemical agent. Therefore the carbonization stage is more environmental friendly and safe. Moreover, the panel blank material becomes more stable, has corrosion resistance and obtains the color as valuable timber in carbonization stage. Consequently soft wood is good enough to replace some valuable timber; and 5. Same internal/external colour: the carbonized wood has the same internal/external colour. According to different wood species and process, the carbonized wood has yellow colour and dark brown colour. As to some fast-growing timber such as pine, fir and cottonwood, they obtain the colour the same as some valuable tropical wood after carbonization. They have an excellent stability and look elegant.

It is proven through practice that the yield quantity can reach to 99%, even 100% after above hot pressing and carbonization stage.

As another preferred option, the hot pressing process is to put the panel blank material on the hot press and close the hot pressing panels with speed of 0.5-6 mm/s. Control the compression ratio of panel blank material at 10-30%, pressure at 20-50 MPa and hot pressing panel temperature at 170-200° C. and maintain the temperature and pressure for 1 min-40 min; the said pre-carbonization step is to raise the hot pressing panels temperature to 160-170° C. and maintain the temperature and pressure for 30 min-120 min after compression; the said carbonization step is to raise the hot pressing panels temperature to 200-225° C. and maintain the temperature and pressure for 45 min-120 min after pre-carbonization. As the temperature of the panel blank material changes sharply in hot pressing stage when hot pressing panel temperature is at 170-200° C., it is helpful to guarantee the product quality. But residual stress is generated. In pre-carbonization step, reduce the hot pressing panel temperature to 160-170° C. and maintain and the temperature and pressure to fully release the internal stress of the panel blank material to prevent it from cracking in follow-up carbonization stage; hot pressing panel temperature under 200-225° C. is the carbonization stage. It is proven from practice that the above hot pressing and carbonization stage can make the yield quantity reaching to 99% or even 100%.

As preferred the cooling step in (7) is to reduce the hot pressing panel temperature to below 120° C. when pressure is maintained. The purpose of the cooling step is to reduce the panel blank material temperature to below 120° C. after hot pressing and carbonization. That is to reduce the panel blank material temperature to below plastic temperature point and fix the panel blank material after hot pressing and carbonization.

As another preferred option, the cooling step in (7) is to slowly reduce pressure and open the hot press after carbonization. Immediately take out the panel blank material and move them to hot press with normal temperature, then quickly shut the hot press and control the pressure of normal temperature hot press at 0.2-4 MPa.

As preferred, the moisture content control step in (8) is to move the cooled panel blank material to a temperature/humidity control room and control the moisture content with internal temperature at 39-80° C. and relative humidity at 75-95% to recover the wood moisture content to 4-12%; moisture content recovery step is to make the wood adaptable to various climate.

As preferred it also includes a painting stage (with pressure roller) after carbonization, which it is to press the UV resin into compacted layer for 0.05-0.15 mm under the pressure of 0.5-1.0 Mpa. When UV resin is pressed into the first compacted layer or second compacted layer, it further makes the paint contact with the wood surface fiber to create the solidification reaction. Consequently the paint film is both hard and soft and the performance of the compressed wood is improved.

The wood product made from above manufacturing method includes a compacted layer and a natural layer. The compacted layer is the first compacted layer and the second compacted layer at two sides of the natural layer. This type of wood has total density of 350-750 kg/m$^3$, moisture content 4-12%, corrosion grade II and weight loss $\leqq$24%. The product has no viscose. The natural layer is the original wood structure without compression. The structure may be affected during the compression, but it can be ignored compare with the compacted layer. The density of the said first compacted layer and the second compacted layer (0.6-4 mm from one surface to the opposite surface) gradually reduces to the natural density of the wood. The compacted layer and the natural layer are connected by fiber, which is different from existing plywood. The above connection is firm, environmental friendly and easy to operate. The surface paint film hardness of the first compacted layer or the second compacted can reach to 3-6 H.

Moisture content of solid wood section material is 4-12%. Moisture content indicates water weight in the wood and wood weight percentage after drying. Moisture absorption equilibrium moisture content under atmospheric condition indicates the stable moisture absorption moisture content achieved eventually under certain temperature/humidity conditions. Generally speaking, the moisture content of wood is different in places. For example, the average equilibrium moisture content in Guangzhou is 15.1% while in Beijing it is 11.4%. Wood dried to 11% is usable in Beijing but in Guangzhou it would expand and distort after absorbing moisture. Therefore, In order to guarantee the stability of the wood product, the final moisture content should be close to or the same as the equilibrium moisture content. In this invention, after carbonization, it not only increases the surface hardness of the wood and achieves a better fixation but largely decreases its hygroscopicity and minimizes the influence on dimensional stability due to temperature/humidity change in different seasons. The product service life is then prolonged, its moisture content needs not to be adjusted under different weather conditions and can be used in various regions and weather.

The surface hardness of the surface-reinforced solid wood section material in this invention is above 1500N (2.0 times of its natural layer) according to GB1941-91-Wood Hardness Test Method. Meanwhile, the equilibrium moisture content is largely lower than the compressed wood made with existing technology. In actual application the product's moisture content fluctuate in a low level and dimensional stability improves noticeably. Since the compacted layer of current compressed wood needs to be sealed off, a large number of chemicals are required as a result, but the product of this invention does not contain the above chemicals. Moreover, as anticorrosion performance of surface-reinforced solid wood section material is excellent, a test is conducted on carefully selected wood samples according to GB/T13942.1-1992-Wood Natural Durability and Corrosion Resistance Test Method, it is found that the corrosion resistance grade is >II and weight loss $\leqq$24%.

Raw materials of the above surface-reinforced solid wood section material are fast growing timber such as fir, masson pine, larch, cottonwood and paulownia. Before they are processed, their mechanical property, corrosion resistance, moisture proof and stability are poor and they are easy to be invaded by insects and easy to crack.

As preferred the corrosion resistance grade should be above I.

As preferred the thickness of the first compacted layer and the second compacted layer is 1-2 mm.

As preferred the moisture content should be 6.5-10% and 7-9% would be more preferred.

As preferred the thickness of the first compacted layer and the second compacted layer is 0.6-4 mm and the density of compacted layer is 1.3-3 times of that for natural layer.

As preferred for above proposal, the solid wood is cottonwood with total density of 380-550 kg/m$^3$, moisture content 6-12%. The thickness of the first compacted layer and the second compacted layer is 0.6-4 m.

As preferred the solid wood is southern pine with total density of 500-720 kg/m$^3$, moisture content 4-11%. The thickness of the first compacted layer and the second compacted layer is 0.6-3 mm.

As preferred the solid wood is masson pine with total density of 480-680 kg/m$^3$, moisture content 5-10%. The thickness of the first compacted layer and the second compacted layer is 0.6-2.5 mm.

As preferred the solid wood is fir with total density of 350-550 kg/m$^3$, moisture content 5-10%. The thickness of the first compacted layer and the second compacted layer is 0.6-2.5 mm.

Advantages of surface-reinforced solid wood product:

1. Thickness and density distribution: The thickness of the first compacted layer and the second compacted layer is 0.6-4 m and the density of the first compacted layer and the second compacted layer are 1.3-3 times of that for natural layer;

2. Hygroscopicity: 45% lower compare with source material; and

3. Dimensional stability: 55% higher compare with its source material.

In conclusion, the present invention has the following positive effects:

1. This type of solid wood section material can use fast-growing timber. Such timber is resourceful and low in price. After compression and carbonization, its surface will have the microenvironment property and excellent mechanical property as natural and fine wood from valuable trees. This invention uses physical property improvement technology for combined type wood taking shape at a time. That is the finished product is directly produced after carbonization. It reduces many stages such as soaking with adhesive. It is also economical and improves the mechanical property and maintains the natural property of the wood;

2. The equilibrium moisture content of this type of solid wood section material fluctuates in a low level. The product also has high dimensional stability, strong corrosion resistance and climate resistance. The moisture content of the product needs not to be adjusted and it can be placed in different environmental conditions such as outdoor or indoor with underground heat;

3. The compacted layer of this type of solid wood section material connects with the fibre of natural layer. They do not have the problem such as gluing and separation. After carbonization and when compacted layer is fixed, the wood will have a new property—hard on surface and soft in bottom. It is suitable to be used for solid wood floor boards, which are beautiful, comfortable and no dangerous gas, especially for household having baby and the elderly. Normal solid wood floor boards cannot compare with them;

4. Drying before compression method adopted in the manufacture of this type of solid wood section material is helpful to prevent wood from going moldy or creating blue stain or damaging the wood appearance. It is also helpful to prevent wood from cracking during follow-up compression to damage machines or cause human injure. Hence the wood yield quantity and quality is improved;

5. The manufacturing method used in this type of solid wood section material is simple and suitable for mass production. The key stage involved in this invention is wood drying, compression and carbonization. So long as these steps are properly followed, a high quality product can be developed;

6. The manufacturing method used in this type of solid wood section material is to press the UV solidified resin into the compacted layer of the wood to form the permanent solidification. In other words, the compacted layer is permanently sealed off. It effectively reduces the moisture absorption capability of the wood and further enhances the wood dimensional stability to avoid rebound;

7. Wood performance improvement method is adopted to shape the wood after carbonization at a time under high temperature and high pressure. The process used for the surface-reinforced solid wood section material is simple. No chemical agent is required during carbonization stage after compression without discharging waste water and gas. As thermal utilization factor is high and it is environmentally friendly, it is effectively to overcome the inherent defects of wood. It solves the complicated problem that cannot be addressed by current technology, that is, to protect the environment while resolving the rebound problem. It is helpful for the implementation of industrialization; and 8. The wood section material made from the present invention has a first compacted layer and a second compacted layer. Therefore, they are widely used in various fields. Apart from the floor boards, they can also be used for furniture and office facilities such as desks and tables. If so, two processing methods have to be employed. Afterwards, two single panels with compressed surface need to be put together. The solid wood section material made by this manufacturing method has more advantages, which means that two single panels with compressed surface need not to be put together for furniture or office facilities.

Figure 1:
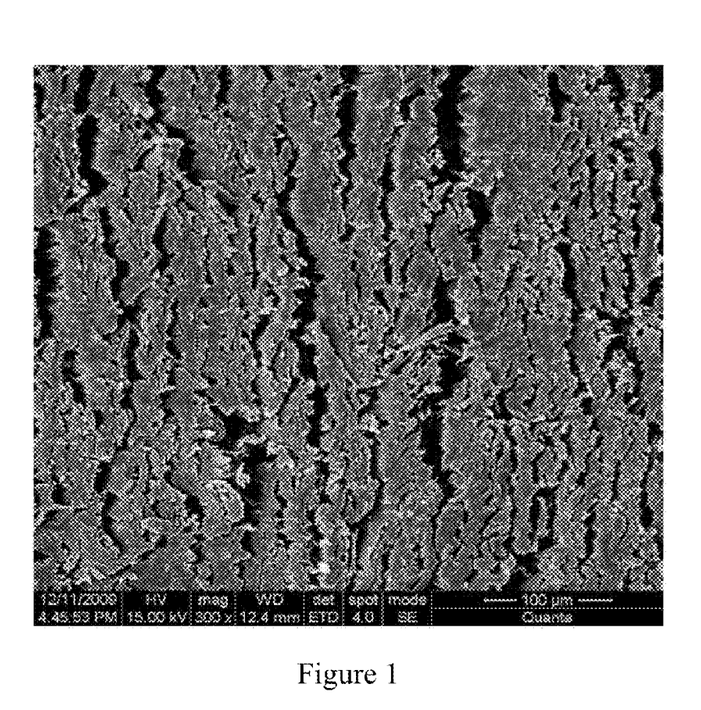
FIG. 1 shows the image of slitting electric mirror of the connection between the first layer and the natural layer of the cottonwood after compression and carbonization as described in embodiment 1.
Figure 2:
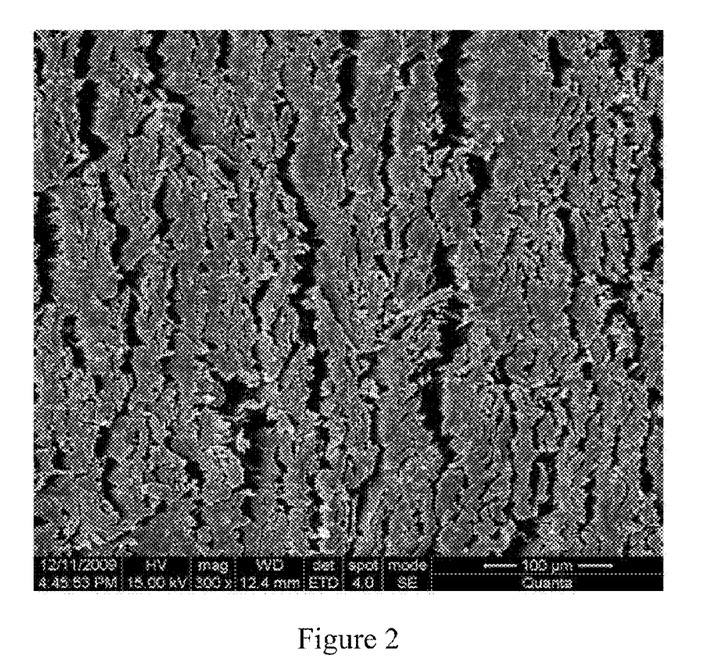
FIG. 2 shows the image of slitting electric mirror for cottonwood source material described in embodiment 1.

FIG. 1 and FIG. 2 respectively show the image of slitting electric mirror for finished product and cottonwood source material, in which the source material in FIG. 2 has even cellular structure and in FIG. 1. It clearly shows that the density of the first compacted layer (the density of the second compacted layer is similar of the first compacted layer), 2-3 mm from the surface and further down it has the even cellular structure.

Figure 3:
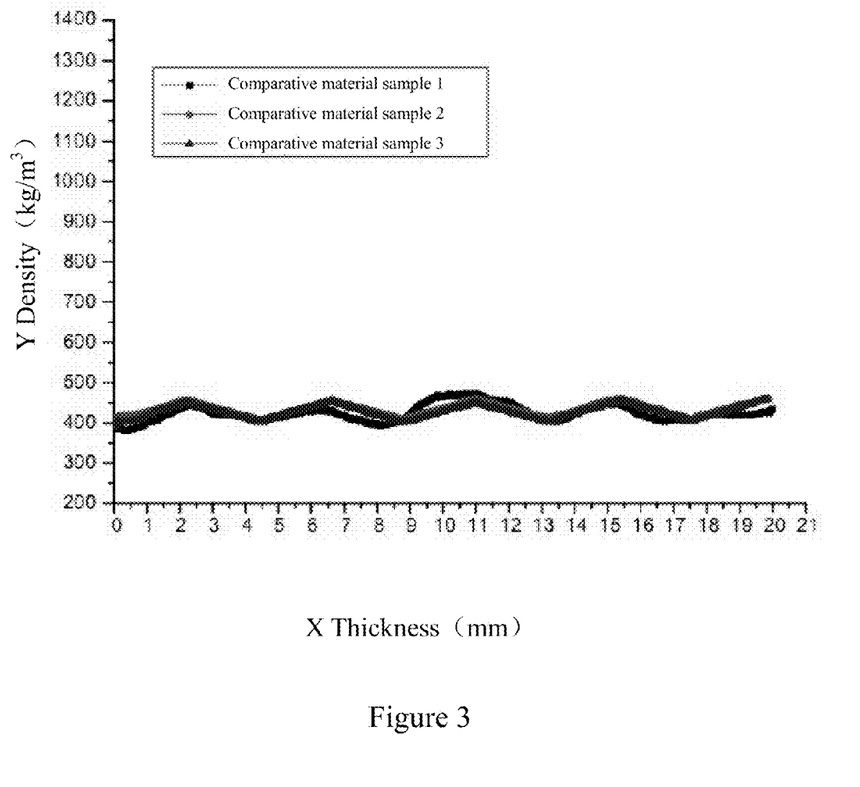
FIG. 3 shows the density distribution of cottonwood source material along the thickness direction described in embodiment 1.
Figure 4:
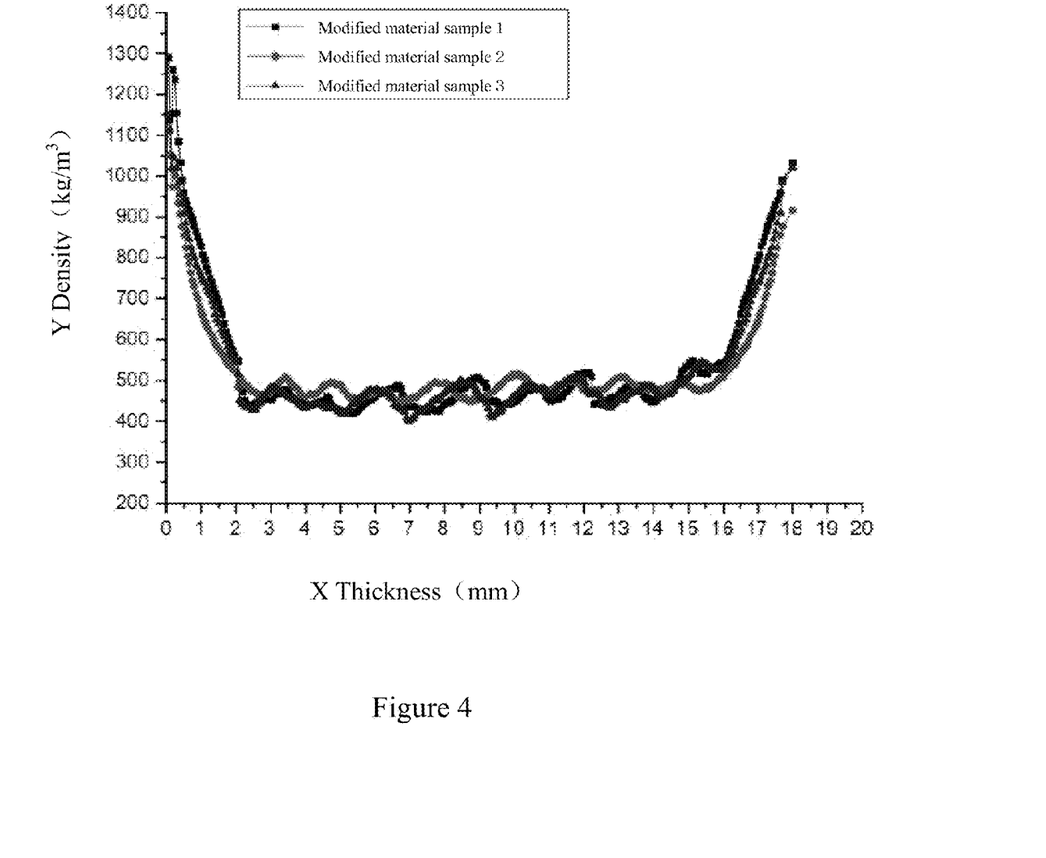
FIG. 4 shows the density distribution of compressed and carbonized cottonwood source material along the thickness direction described in embodiment 1.

FIG. 3 and FIG. 4 respectively show the density distribution of the source material and finished product with 3 samples for each experiment. It is found that the surface after compression process has enhanced density 2-3 mm from the surface.

DESCRIPTION OF THE PREFERRED EMBODIMENT

A further description is provided with the figures.

The embodiment is a further description rather than the restriction of the present invention. Technicians may make simple modification without fundamental change to this specification. As long as they are within the scope of the claims, they are all protected by patent paw.

Embodiment 1

Manufacturing method for a type of cottonwood floor board. Select the raw cottonwood as the source material. After they are cut with the same size and piled in order and use forklift to transfer them to a steam type drying kiln with top ventilation to dry them. Maintain the moisture content of the panel at 12-14%. Use Weinig Unimat moulder U23EL to polish the wood surface after drying and select two opposite sides of the wood to be compressed (maintain the parallel between the polished surface and fiber) to obtain the panel blank material with thickness at 25 mm. Put them into a three-layer hot press, control the hot pressing panel closing speed at 3 mm/s, hot press pressure at 30 MPa. Raise the temperature of two hot pressing panels to 150° C. and close. Press the panel blank material to 20 mm thickness to allow two hot pressing panels closely stick with the surface of the panel blank material. Maintain the temperature and pressure for 50 min and then raise the temperature of two hot pressing panels to 170° C., control the hot press pressure at 30 MPa and maintain the temperature and pressure for 80 min. Finally raise the temperature of two hot pressing panels to 210° C. and maintain the temperature and pressure for 60 min to complete hot pressing, pre-carbonization and carbonization. When the hot press remains its pressure, use its own cooling system (use heat conduction oil to cool down the hot pressing panel to below 120° C.) to cool down the panel blank material to the plastic temperature point to fix the shape of the panel blank material after carbonization. Place the cooled panel blank material in a temperature/humidity control room to recover the moisture content. Control the temperature/humidity control room at 65° C., relative humidity at 90% to recover the wood moisture content to 6-12%.

Remove the panel blank material and place them in room temperature for a while. The final solid floor boards are made after sealing openings, polishing and painting. FIG. 1 shows the image of slitting electric mirror (the second compacted layer structure is similar with that of the second compacted layer) of the connection between the first layer and the natural layer of the cottonwood after compression and carbonization as described in this embodiment. Compare with FIG. 2, we can see that the fiber gaps are almost removed after compression. Therefore the boards have high hardness and are able to meet the strength requirements of various boards. As the boards' natural layer has loose fiber structure, they are more comfortable and excellent to absorb sound and prevent vibration, like soft wood.

Coating technology with high pressure roller: press low-viscosity UV resin into 0.15 mm of the compacted layer under 1 Mpa pressure. Reinforce the compacted layer again after UV solidification. These reinforced layers are helpful to isolate the external moisture from entering into the compacted layer; hence the wood stability is improved. The paint film hardness of the first compacted layer or the second compacted layer is 2 H-6 H.

Compare with FIG. 3 and FIG. 4, the compressed surface, 2.5 from the inside, of the solid wood is noticeably enhanced.

Embodiment 2

The manufacturing method for a kind of southern pine floor board uses fast-growing trees as the source material of the solid wood. After they are cut with the same size and piled in order, use forklift to transfer them to a steam type drying kiln with top ventilation to dry the panels with high temperature and high humidity. Control the moisture content within 10-18%. Use Weinig Unimat moulder U23EL to polish the wood surface after drying and select two opposite sides of the wood to be compressed (maintain the parallel between the polished surface and fiber) to obtain the 30 mm panel blank material. Put them into a three-layer hot press, control the hot pressing panel closing speed at 4 mm/s, internal hot press pressure at 40 MPa. Raise the temperature of two hot pressing panels to 180° C., press the panel blank material to 24 mm thickness and maintain the temperature and pressure for 25 min. Use its own cooling system, that is to use heat conduction oil to cool down the hot pressing panel to below 160° C. and maintain the temperature and pressure for 45 min. Finally raise the temperature to 210° C. and maintain the temperature and pressure for 60 min to complete hot pressing, pre-carbonization and carbonization. Afterwards, slowly release the pressure, open the hot press, quickly remove the panel blank material and place them in a hot press with normal temperature. Close the hot press and press the panel blank material surface with the pressing panels. Control the pressure at 2.5 MPa, cool them down and reduce the temperature of panel blank material to below 120° C. after carbonization. That is to reduce the temperature of the panel blank material to its plastic temperature point to fix the shape of the carbonized panel blank material. Place the cooled panel blank material in the temperature/humidity control room to recover the moisture content. Control the internal temperature/humidity control room at 60° C., relative humidity at 95% to recover the wood moisture content to 7-12%.

Remove the panel blank material and place them in room temperature for a while. Then the final solid floor boards are ready after sealing openings, polishing and painting.

After carbonization, the boards have even yellow color on their surface and the moisture capacity reduces sharply. Their equilibrium moisture content remains at 7-12% and the paint film hardness of the first compacted layer or the second compacted layer is 2 H-6 H.

The differences between embodiment 3-5 and embodiment 1 are shown in Table 1:

polished surface and fiber) to obtain the panel blank material with thickness at 50 mm. Put them into a three-layer hot press, control the hot pressing panel closing speed at 3.5 mm/s, hot press pressure at 50 MPa. Raise the temperature of two hot pressing panels to 160° C., press the panel blank material to 40 mm thickness and maintain the temperature and pressure for 45 min. Then raise the temperature of two hot pressing panels to 180° C., control and maintain the temperature and pressure for 90 min. Finally raise the temperature of the last two hot pressing panels to 210° C. and maintain the temperature and pressure for 80 min to complete hot pressing, pre-carbonization and carbonization. Use its own cooling system;

TABLE 1

| Items | Embodiment 1 | Embodiment 2 | Embodiment 3 | Embodiment 4 | Embodiment 5 |
|---|---|---|---|---|---|
| Source material | Cottonwood | Southern pine | Fir | Masson pine | paulownia |
| Hot pressing panel temperature in hot pressing stage | 150° C. | 180° C. | 200° C. | 160° C. | 170° Ca |
| Internal pressure of hot press | 30 MPa | 40 MPa | 50 MPa | 20 MPa | 35 MPa |
| Hot pressing panel closing speed | 3 mm/s | 1.5 mm/s | 0.5 mm/s | 2 mm/s | 6 mm/s |
| Temp./Pressure remaining time | 50 min | 25 min | 40 min | 90 min | 1 min |
| Hot pressing panel temperature in pre-carbonization | 170° C. | 160° C. | 160° C. | 180° C. | 160° C. |
| Temp./Pressure remaining time in pre-carbonization | 80 min | 45 min | 120 min | 90 min | 120 min |
| Pressing distance | 5 mm | 5 mm | 4 mm | 3 mm | 2 mm |
| First compacted layer thickness | 2 mm | 2.5 mm | 2 mm | 1.2 mm | 0.6 mm |
| Second compacted layer thickness | 2.1 mm | 2.4 mm | 1.8 mm | 1.1 mm | 0.7 mm |
| Hot pressing panel temperature in carbonization | 210° C. | 210° C. | 225° C. | 200° C. | 225° C. |
| Temp./Pressure remaining time in carbonization | 60 min | 60 min | 120 min | 45 min | 90 min |
| Moisture content | 6-12% | 4-12% | 5-10% | 5-10% | 7-9% |
| UV coating pressure | 1 MPa$^3$ | 1 MPa$^3$ | 0.5 MPa$^3$ | 0.7 MPa$^3$ | 0.8 MPa |
| Compacted layer thickness with pressed UV resin | 0.15 mm | 0.1 mm$^3$ | 0.07 mm$^3$ | 0.09 mm$^3$ | 0.06 mm$^3$ |
| Surface painting film hardness | 2H$^3$-6H | 2H$^3$-6H$^3$ | 2H$^3$-4H$^3$ | 2H$^3$-4H | 2H$^3$-4H$^3$ |
| Total density | 380-550 kg/m$^3$ | 500-720 kg/m$^3$ | 350-550 kg/m$^3$ | 480-680 kg/m$^3$ | 350-550 kg/m$^3$ |
| Source material density | 350-450 kg/m | 450-620 kg/m | 320-420 kg/m | 400-640 kg/m | 300-400 kg/m |
| First compacted layer density | 480-1200 kg/m | 550-1350 kg/m | 400-1000 kg/m | 550-1300 kg/m | 400-1000 kg/m |
| Corrosion resistance grade | >II | >II | >II | >II | >II |
| Weight loss | ≦15% | ≦10% | ≦9% | ≦17% | ≦12% |

The density of the second compacted layer is similar of that for the first compacted layer.

Embodiment 6

Manufacturing method of a type of desk surface. Select fast-growing timber as the source material of the solid wood and after they are cut with the same size and piled in order, use forklift to transfer them to a steam type drying kiln with top ventilation to dry the wood. Control the moisture content within 15-20%. Use Weinig Unimat moulder U23EL to polish the wood surface after drying and select two opposite surfaces to be compressed (maintain the parallel between the that is to use heat conduction oil to cool down the hot pressing panel to below 100° C. (i.e. to lower the panel blank material temperature to its plastic temperature point) to fix the shape of panel blank material. Cool them down and place the cooled panel blank material in a temperature/humidity control room to recover the moisture content. Control the internal temperature/humidity control room at 65° C., relative humidity at 90% to recover the wood moisture content to 9-12%.

Remove the panel blank material and place them in room temperature for a while. Then the final solid floor boards are ready after sealing openings, polishing and painting.

Coating technology with high pressure roller: press low-viscosity UV resin into 0.12 mm of the compacted layer under 1.0 Mpa pressure. Reinforce the compacted layer again after UV solidification. These reinforced layers are helpful to isolate the external moisture from entering into the compacted layer; hence the wood stability is improved. The paint film hardness of the first compacted layer or the second compacted layer is 2 H-6 H.

The invention claimed is:

1. A method for manufacturing a wood section material, comprising:
   processing a wood sample having a density lower than or equal to 700 kg/m³ into wood panels;
   drying the wood panels to reduce their moisture content to between 6% and 20%;
   polishing the dried wood panels to form a panel blank material;
   pressing opposing surfaces of the panel blank material using two hot pressing panels having a temperature between 140° C. and 200° C., wherein said pressing using two hot pressing panels comprises placing the panel blank material on a hot press having a closing speed of between 0.5 mm/sec and 6 mm/sec, controlling the panel blank material compression ratio at between 10% and 30% and pressure at between 20 MPa and 50 MPa, controlling the hot press temperature at between 150° C. and 160° C. and maintaining the temperature and pressure for between 30 minutes and 120 minutes;
   pre-carbonizing the panel blank material, wherein said pre-carbonizing the panel blank material comprises raising the hot pressing panels temperature to between 170° C. and 180° C. and maintaining the temperature and pressure for between 30 minutes and 120 minutes and maintaining the temperature and pressure for between 30 minutes and 120 minutes;
   carbonizing the panel blank material, wherein carbonizing the panel blank material comprises raising the hot pressing panels' temperature to between 200° C. and 225° C. and maintaining the temperature and pressure for between 45 minutes and 120 minutes after pre-carbonization;
   cooling the panel blank material; and
   controlling moisture content of the panel blank material.

2. The method according to claim 1, wherein cooling the panel blank material comprises reducing the temperature of the hot press panels to below 120° C. while maintaining pressure on the hot press panels.

3. The method according to claim 1, wherein cooling the panel blank material comprises releasing the pressure on the hot press panels and opening the hot press after carbonizing the panel blank material and transferring the panel blank material from the hot press to a second press having pressure panels at between 0.2 MPa and 4 MPa.

4. The method according to claim 1, wherein controlling moisture content of the panel blank material comprises transporting the cooled panel blank material to a humidity room to recover the moisture content, controlling the room's internal temperature at between 39° C. and 80° C. and a relative humidity of between 75% and 95% to allow the wood to recover the moisture content to between 4% and 12%.

* * * * *